(12) United States Patent  
Gencaslan et al.

(10) Patent No.: US 10,843,748 B2
(45) Date of Patent: Nov. 24, 2020

(54) SPOILER ASSEMBLY FOR A VEHICLE

(71) Applicant: WABCO Europe BVBA, Brussels (BE)

(72) Inventors: Umut Gencaslan, Hannover (DE); Olaf Mentzendorff, Gehrden (DE); Gandert Marcel Rita Van Raemdonck, PW Delft (NL)

(73) Assignee: WABCO Europe BVBA, Brussels (BE)

( * ) Notice: Subject to any disclaimer, the term of this patent is extended or adjusted under 35 U.S.C. 154(b) by 7 days.

(21) Appl. No.: 16/333,033

(22) PCT Filed: Jul. 21, 2017

(86) PCT No.: PCT/EP2017/000890
§ 371 (c)(1),
(2) Date: Mar. 13, 2019

(87) PCT Pub. No.: WO2018/054514
PCT Pub. Date: Mar. 29, 2018

(65) Prior Publication Data
US 2019/0248427 A1   Aug. 15, 2019

(30) Foreign Application Priority Data

Sep. 20, 2016 (DE) .......... 10 2016 011 317

(51) Int. Cl.
*B62D 35/00* (2006.01)
*B62D 37/02* (2006.01)
(52) U.S. Cl.
CPC .......... *B62D 35/001* (2013.01); *B62D 35/007* (2013.01); *B62D 37/02* (2013.01); *Y02T 10/82* (2013.01)
(58) Field of Classification Search
CPC ... B62D 35/001; B62D 35/007; B62D 35/002
(Continued)

(56) References Cited

U.S. PATENT DOCUMENTS 5,498,059 A * 3/1996 Switlik ............... B62D 35/001
                                                    296/180.1
9,145,177 B2   9/2015 Smith et al.
(Continued)

FOREIGN PATENT DOCUMENTS

DE   202009014476 U1   2/2010
DE   102009014860 A1  10/2010

OTHER PUBLICATIONS

European Patent Office, Rijswijk, Netherlands, International Search Report of International Application No. PCT/EP2017/000890, dated Nov. 14, 2017, 2 pages.

*Primary Examiner* — Dennis H Pedder
(74) *Attorney, Agent, or Firm* — Dickinson Wright PLLC

(57) ABSTRACT

A spoiler assembly for a vehicle includes a first air-guiding element adjustable between a basic position and an activated driving position by a first adjustment device (6) and a second air-guiding element adjustable between a basic position and an activated driving position by a second adjustment device (7). In a first partial adjustment during the adjustment from the basic positon into the driving position, the first air-guiding element is adjustable and the second air-guiding element is not adjustable. In a second partial adjustment following the first partial adjustment, the second air-guiding element, preferably the two air-guiding elements, is or are adjustable. second adjustment device (7) is activated via a first position-switching device (15) switchable between an open position for actuating the second adjustment device (7) and a blocking position depending on an adjustment position of the first air-guiding element.

19 Claims, 2 Drawing Sheets

(58) Field of Classification Search
USPC .......................................... 296/180.1–180.5
See application file for complete search history.

(56) References Cited

U.S. PATENT DOCUMENTS

| | | |
|---|---|---|
| 2008/0093886 A1 | 4/2008 | Nusbaum |
| 2010/0106380 A1 | 4/2010 | Salari et al. |
| 2015/0097393 A1* | 4/2015 | Dieckmann .......... B62D 35/001 296/180.4 |
| 2016/0347380 A1* | 12/2016 | Dieckmann .......... B62D 35/007 |

* cited by examiner

SPOILER ASSEMBLY FOR A VEHICLE

TECHNICAL FIELD

The present disclosure relates to a spoiler assembly for a vehicle, in particular a truck. The spoiler assembly can be in particular a rear spoiler assembly with a side air-guiding element and a roof air-guiding element.

BACKGROUND

Commercial vehicles, in particular trucks, having a substantially box-shaped rear region generally have unfavorable aerodynamic properties. Air-guiding elements for extending the contours and for aerodynamic conduction of air are therefore known, the air-guiding elements in particular extending the surfaces of the side walls and of the roof to the rear, e.g. rectilinearly or also in curved surfaces toward the center. By this means, the aerodynamics of the vehicle can be improved and the fuel consumption correspondingly reduced.

The rear spoiler devices can generally be adjusted between their basic position and an unfolded or extended driving position. In the basic position, free access to the doors provided in the rear region, e.g. two rear doors swinging open outward, is intended to be provided. However, such adjustments are sometimes problematic since, during the adjustment or reverse adjustment, the individual elements can collide with one another and the length of the air-guiding elements is often limited in order to avoid collisions.

U.S. Pat. No. 9,145,177 B2 describes a rear spoiler device for a truck. In the unfolded driving positon, the side air-guiding elements and roof air-guiding elements are connected directly to one another; they can be retracted and extended via cylinders attached to the rear door.

DE 10 2009 014 860 A1, DE 20 2009 014 476 U1 describe further rear spoiler assemblies.

SUMMARY

The invention is based on the object of providing a spoiler assembly which is adjustable between a basic position and a driving position with little outlay and high reliability.

This object is achieved by a spoiler assembly, in particular a rear spoiler assembly, which has one or two side air-guiding elements and roof air-guiding elements. In particular in the case of the customary design of a truck with two rear doors pivoting open outward, one side air-guiding element and one roof air-guiding element can be provided here for each rear door.

Such a rear spoiler assembly is fastenable in particular entirely to the rear door, and therefore no fastenings or no relevant fastenings to the vehicle structure or to the vehicle are required. In the retracted basic position, opening and forward pivoting of the rear door by approximately 270° is advantageously made possible, and therefore the rear door can be placed forward from the outside against the side wall and fastened there, wherein, in such a design, the folded-in rear spoiler device is therefore received between the rear door and the side surface or outer side of the vehicle.

However, in addition to a rear spoiler device, other spoiler assemblies can be correspondingly formed, in which two air-guiding elements are adjusted successively or entirely or partially staggered in time.

The invention is based on the concept of adjusting two adjustable air-guiding elements in a staggered or successive manner such that, first of all, in a first partial adjustment, only the first air-guiding element is adjusted, and the latter, during the adjustment thereof, enables or activates the adjustment of the second air-guiding element.

For this purpose, during the first partial adjustment of the first air-guiding element, a first position-switching device is preferably actuated, which enables the adjustment of the second air-guiding element. The first position-switching device can be activated, e.g. directly by the air-guiding element, or indirectly by an element adjusted at the same time, e.g. first adjustment device.

The advantage is therefore achieved that a collision of the air-guiding elements during their adjustments, or an incorrect unfolding operation with air-guiding elements wrongly folded apart or into one another can be avoided. In the case of a rear spoiler device in which, in the basic position, the roof air-guiding element is placed onto the rear door, and subsequently the side air-guiding element is placed onto the folded-in roof air-guiding element and the rear door, during the adjustment into the driving position the side air-guiding element can therefore be adjusted as the first air-guiding element. If the adjustment movement of the first air-guiding element is prevented by, e.g. friction, or by air flows already present during the journey, this does not adversely affect the sequence of the unfolded operation. Only when the first partial adjustment is reached does the first air-guiding element enable the adjustment of the second air-guiding element. The second air-guiding element can therefore subsequently likewise undertake the adjustment operation or unfolding operation into the driving position without colliding with the first air-guiding element.

The air-guiding elements can be adjusted consecutively or successively such that, with the first partial adjustment, the first air-guiding element is already completely adjusted, or else partially simultaneously, and therefore, in the second partial adjustment, the first and second air-guiding elements are adjusted together.

The spoiler assembly therefore permits reliable adjustments and reliable unfolding and folding-in operations with little outlay on hardware since the sequence of the adjustment operations is ensured. It is therefore also possible for spoiler assemblies to be formed in which the individual air-guiding elements or further mechanical parts overlap or intersect in their pivoting paths since the sequence of the adjustment can be ensured.

Since the position-switching device is switched directly by the adjustment of the first air-guiding element, erroneous operations or erroneous settings are also prevented; for as long as the first air-guiding element has not reached the switching position for enabling the following second air-guiding element, no pneumatic adjustment can take place.

The reverse adjustment can also take place by means of a position controller, wherein, for this purpose, the second position-switching device is advantageously provided which, in a first partial adjustment of the reverse adjustment, first of all blocks the first air-guiding element until the second air-guiding element has reached its switching position and switches the second position-switching device, as a result of which the activation, e.g. pneumatic activation, of the first air-guiding element is permitted.

The reverse adjustment is therefore ensured in a corresponding manner to the adjustment.

The adjustment devices can in particular be formed pneumatically, for example as double-acting pneumatic cylinders which can adjust the air-guiding elements in both directions. In a pneumatic design, the first position-switching device can advantageously be designed as a pneumatic valve which activates the second pneumatic adjustment device and is adjustable between a blocking and an open position. The advantage of a high degree of safety and reliability is therefore achieved since the pneumatic activation of the second adjustment device for the second air-guiding element is only enabled by the adjustment of the first position-switching device; beforehand, no adjustments are possible in the blocking position.

The position-switching device can be directly designed as a mechanically adjustable pneumatic valve with two positions, e.g. a blocking position and upon actuation of an enabled position. It can be designed in particular as a 3/2-way directional control valve which is adjustable mechanically via a stop. Such a valve can be formed cost-effectively and ensures a high degree of reliability.

As an alternative to a direct mechanical actuation of the position-switching devices, i.e. the design as mechanically adjustable pneumatic valves with two positions, electric activation of the position-switching devices is also possible. Stop switches or position switches (proximity switches) can thus be provided which, when the first air-guiding element or second air-guiding element approaches a position, are actuated and close a current circuit. Control valves which are in each actuatable electrically (solenoid control valves), the energizing of which takes place depending on the position, are therefore connected upstream of pneumatic actuating devices for the first air-guiding element and/or second air-guiding element.

The pneumatic actuating devices can be in particular double-acting pneumatic cylinders, the cylinder space and piston space of which are therefore each connected to a control connection of a common spoiler control valve.

The entire spoiler assembly can be formed here with a compact pneumatic or electro-pneumatic system. The first pneumatic actuating device with a second position-switching device connected upstream, and the second pneumatic actuating device with a first position-switching device connected upstream can therefore be connected in parallel; in particular, e.g. in the case of a rear spoiler assembly with two rear doors, the devices for both doors can also be connected in parallel, and therefore only one common spoiler control valve is provided which, depending on adjustment, ventilates its first pneumatic control output in order to connect the adjustment into the driving position, or its second pneumatic control output for the reverse adjustment into the basic position. The other control output in each case can serve here in each case as a venting means or can be connected to a venting means.

However, as an alternative to pneumatic adjustments, other actuations, in particular electrically or hydraulically, are also possible. In the event of an electric actuation, the position-switching devices can be designed, for example, as electric switches. Hydraulic adjustments can be designed in a manner corresponding to the pneumatic adjustments, i.e., for example, with double-acting pistons and valves in the activation thereof.

The invention will be explained in more detail below using a number of embodiments with reference to the attached drawings.

DETAILED DESCRIPTION

Figure 1:
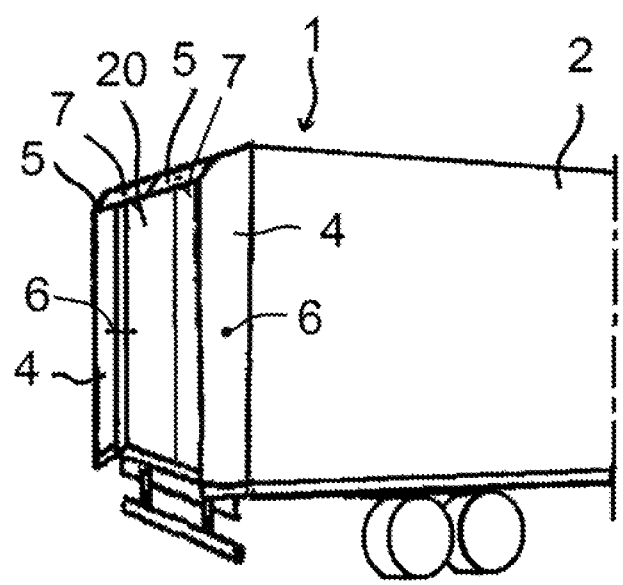
FIG. 1 shows the rear region of a truck with a spoiler assembly.

Now referring to FIG. 1, a spoiler assembly 1 is attached to a truck 2. The spoiler assembly 1 is adjustable via an electropneumatic adjustment system 3 shown in more detail in FIG. 2. On each rear door 20, the spoiler assembly in each case has a side air-guiding element 4 as first air-guiding element and a roof air-guiding element 5 as second air-guiding element.

Figure 2:
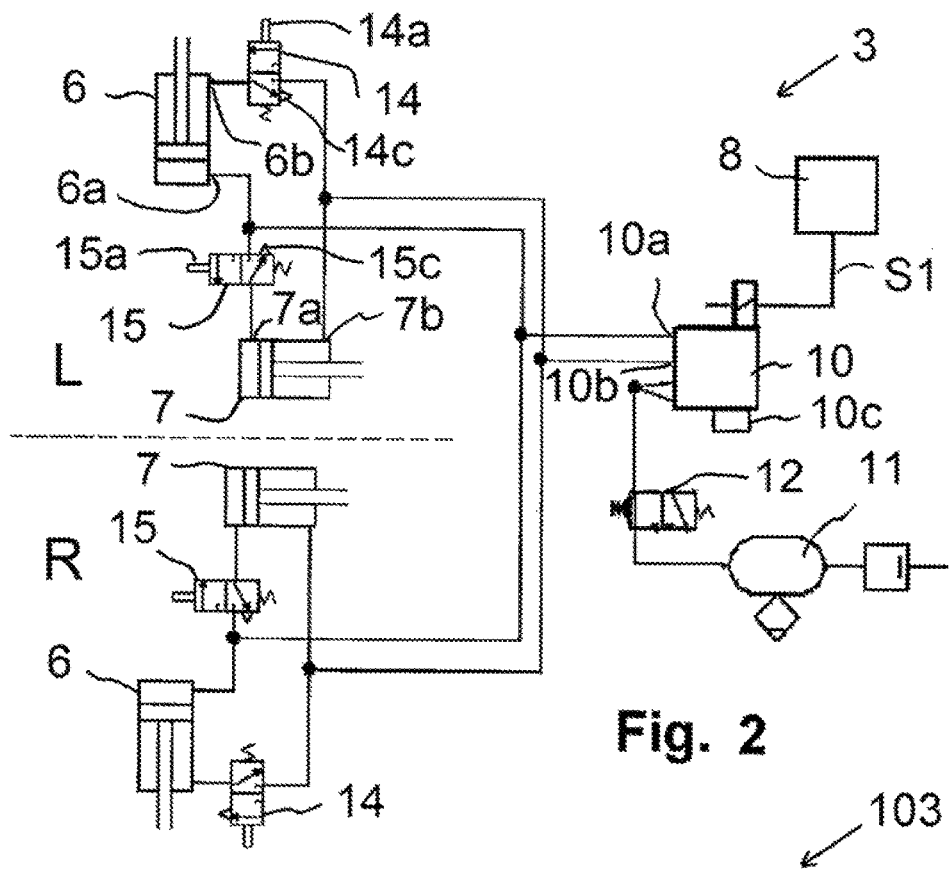
FIG. 2 shows an electropneumatic circuit diagram of the adjustment system for adjusting the spoiler assembly according to one embodiment.
Figure 3:
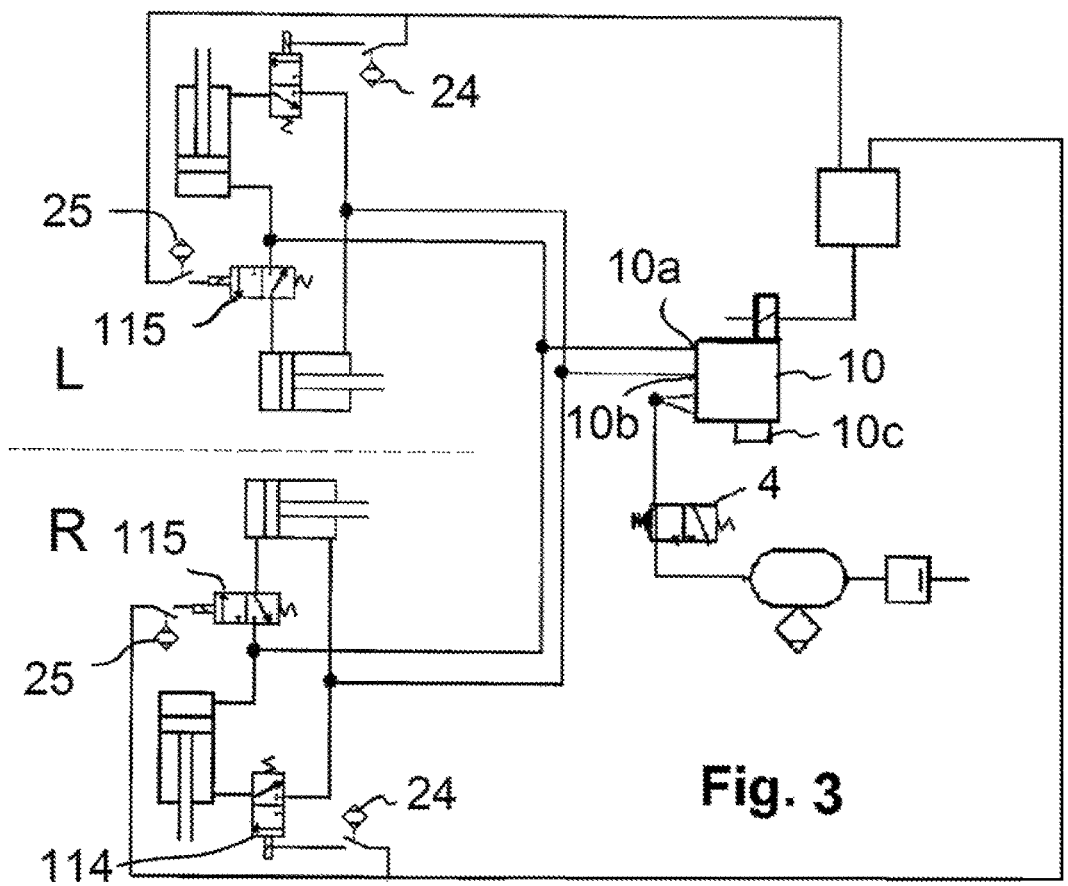
FIG. 3 shows an electropneumatic circuit diagram of the adjustment system for adjusting the spoiler assembly according to a further embodiment.

The side air-guiding elements 4 and roof air-guiding elements 5 are adjustable separately via pneumatic adjustment devices which, according to the embodiments of FIGS. 2 and 3, are double-acting (bidirectional) pneumatic cylinders 6 and 7. It is also possible here for, for example, in each case two such pneumatic cylinders 6, 7 to be connected in parallel, depending on the size of the air-guiding elements 4 and 5.

FIG. 2 shows an electropneumatic circuit diagram according to a first embodiment:

An electronic control unit 8 (ECU) of the adjustment system 3 activates a central spoiler control valve 10 by means of electric control signals S1. The spoiler control valve 10 is supplied with compressed air, e.g. in a manner not shown specifically here, from a compressed air container 11 via a valve formation 12 and outputs the received compressed air subsequently either to its first pneumatic control input 10a for the extension operation or the extension adjustment or to the second pneumatic control input 10b for the reverse adjustment, depending on the adjustment operation to be initiated.

The side air-guiding element 4 is adjusted via a side cylinder 6 (or else two side cylinders connected in parallel); FIG. 2 first of all shows the retracted basic position or inoperative position. The double-acting (bidirectional) pneumatic side cylinder 6 has a first pneumatic connection 6a directly connected to the first pneumatic control output 10a of the spoiler control valve 10, and a second pneumatic connection 6b connected to the second pneumatic control output 10b of the spoiler control valve 10 via a mechanically adjustable side stop valve, wherein the roof stop valve 14 is switched in the basic position shown in such a manner that it vents the second pneumatic connection 6b. After adjustment of the roof stop valve 14, the second pneumatic connection 6b is placed onto the second pneumatic control input 10b.

Correspondingly—symmetrically, but interchanged therewith—the roof cylinder 7 is connected with its first pneumatic connection 7a via a side stop valve 15 to the first pneumatic control output 10a and with its second pneumatic connection 7b directly to the second pneumatic control output 10b.

The roof stop valve 14 has a pressure switch 14a as the mechanical control input and is coupled mechanically to the roof air-guiding element 5 on the relevant side, therefore here the left side. This mechanical coupling can take place by direct attaching of the roof stop valve 14 to the roof air-guiding element 5, or else indirectly, by means of an additional mechanical adjustable component, e.g. a mechanical lever adjusted by the roof air-guiding element 5; of relevance here is first of all the mechanical coupling of the adjustment movement of the roof air-guiding element 5 and of the following mechanical actuation of the pressure switch 14a. In a corresponding manner, the side stop valve 15 is adjustable between its inoperative position shown and the actuated position via a pressure switch 15a, wherein the pressure switch 15a in turn is actuatable during the adjustment of the side air-guiding element 4; for this purpose, in turn, the entire side stop valve 15 with the side air-guiding element 4 can be adjustable and, during the adjustment, can impact with its pressure switch 15a against the stop, e.g. of the truck 2, or else of the spoiler assembly 1, or the side air-guiding element 4, or else a mechanical part adjustable by the side air-guiding element 4 impacts during the adjustment thereof against the pressure switch 15a. Direct and indirect actuation are therefore possible.

The spoiler assembly 1 shown and the electropneumatic adjustment system 3 are therefore first of all formed symmetrically and separately with respect to the left and right side since both sides are activated in parallel by the control inputs 10a and 10b, and furthermore a symmetrical or interchanged symmetrical arrangement of the cylinder 6, 7 and of the pressure switches 14 and 15 is provided on each side. By this means, the correct observance of the sequence of the retraction and extension operation is observed:

Starting from the inoperative position, when a control signal S1 is output for the (outward) adjustment, the first pneumatic control input 10a of the spoiler control valve 10 is ventilated, i.e. supplied with compressed air. By this means, the first pneumatic connection 6a of the side cylinder 6 is correspondingly supplied with compressed air, and therefore the side cylinder 6 is adjusted and adjusts the side air-guiding element 4. The air from the piston space of the side cylinder 6 that is output by the second pneumatic connection 6b can be output by the roof stop valve 14 which, in its basic position, places the second pneumatic connection 6b onto a venting means 14b.

In this first partial adjustment, the side stop valve 15 is initially in its blocking basic position shown, and therefore the side cylinder 7 connected via the side stop valve 15 cannot be ventilated via its first pneumatic connection 7a.

During the further mechanical adjustment of the side cylinder 6, at the end of the first partial adjustment, e.g. after a first adjustment distance, the pressure switch 15a is actuated, e.g. by the side air-guiding element 4 itself or a mechanical component coupled to the side air-guiding element 4, such as, for example, the piston of the cylinder 6. In principle, however, it is also possible for the stop valve 15 to carry out the adjustment movement at the same time and to come into contact with a fixed stop of the truck 2. By means of the actuation of the pressure switch 15a, the side stop valve 15 is adjusted into its open position, and therefore subsequently, in the second partial adjustment, the roof cylinder 7 is also ventilated via its first pneumatic connection 7a and is therefore actuated and adjusts the roof air-guiding element 5. The compressed air being output via the second pneumatic connection 7b can be vented here, e.g., via the second control output 10b and the spoiler control valve 10 which, for this purpose, has a vent 10c.

A sequence of the adjustment movement of the air-guiding elements 4 and 5 is therefore ensured: first of all, the side air-guiding element 4 is always adjusted until the latter, after a first adjustment distance, is at least sufficiently pivoted that the roof air-guiding element 5 does not collide during adjustment movement with the side air-guiding element 4. A collision of the outward adjustment is therefore reliably avoided.

For the reverse adjustment, the second pneumatic control output 10b, to which the second pneumatic connection 7b of the roof cylinder 7 is directly connected, is ventilated. The roof cylinder 7 is therefore adjusted back and the roof air-guiding element 5 is thereby pivoted inward. After a first partial reverse adjustment, the roof air-guiding element 5 or a component adjusted therewith, e.g. also the pistons of the roof cylinder 7, comes into contact with the pressure switch 14a of the roof stop valve 14, which is thereby adjusted into its open position such that subsequently, in the second partial adjustment of the reverse adjustment, the two second pneumatic connections 6b and 7b are connected to the second pneumatic control output 10b.

The adjustment and reverse adjustment are therefore inverse with respect to each other: in each case one pneumatic connection of each cylinder 6 or 7 is directly connected to a control output 10a, 10b, and the other pneumatic connection is connected via a stop valve 14, 15 onto the other control output 10b, 10a.

In the embodiments of FIG. 3, roof stop valves 114 and side stop valves 115 are provided with a respective electric control input 114a, 115a, wherein the mechanical actuation at the end of the first partial adjustment (both of the outward adjustment and of the reverse adjustment) takes place via separate pressure switches 24, 25: a roof pressure switch 24 switches the current supply of the roof stop valve 14 and, in a corresponding manner, a side pressure switch 25 switches the current supply of the side stop valve 15. Otherwise, the same functional design of the same switching operation is present during the folding in and unfolding.

LIST OF REFERENCE CHARACTERS (PART OF THE DESCRIPTION)

1 Spoiler assembly
2 Truck
3, 103 Electropneumatic adjustment system
4 Side air-guiding element
5 Roof air-guiding element
6 Side cylinder, first pneumatic adjustment device
6a First pneumatic connection
6b Second pneumatic connection
7 Roof cylinder, second pneumatic adjustment device
7a First pneumatic connection
7b Second pneumatic connection
8 ECU
10 Spoiler control valve
10a First pneumatic control output for the extension operation
10b Second pneumatic control output for the return operation
10c Vent on spoiler control valve 10
11 Compressed air container
12 Valve arrangement
14 Roof stop valve, second position-switching device in FIG. 2
14a Pressure switch
14b Venting means on roof stop valve 14
15 Side stop valve, first position-switching device in FIG. 2
15a Pressure switch
15b Venting means on side stop valve 15
114 Electric roof stop switch, second position-switching device in FIG. 3
115 Electric side stop switch, first position-switching device in FIG. 3
20 Rear door

The invention claimed is:

1. A spoiler assembly (1), comprising:
a first air-guiding element (4) adjustable between a basic position and an activated driving position by a first adjustment device (6),
a second air-guiding element (5) adjustable between the basic position and the activated driving position by a second adjustment device (7),
wherein in a first partial adjustment during an adjustment from the basic positon into the driving position, the first air-guiding element (4) is adjustable and the second air-guiding element (5) is not adjustable,
wherein in a second partial adjustment following the first partial adjustment, the second air-guiding element (5) is adjustable, and
wherein the second adjustment device (7) is activated via a first position-switching device (15, 115) which is switchable between an open position for actuating the second adjustment device (7) and a blocking position depending on an adjustment position of the first air-guiding element (4).

2. The spoiler assembly (1) as claimed in claim 1,
wherein during a reverse adjustment from the driving position into the basic position, in a first partial reverse adjustment the second air-guiding element (5) is adjustable and the first air-guiding element (4) is not adjustable,
in a second partial reverse adjustment following the first partial reverse adjustment, the first air-guiding element (4) is adjustable,
wherein the first adjustment device (6) is activated via a second position-switching device (14, 114) which is switchable between an open position for actuating the first adjustment device (6) and a blocking position depending on an adjustment positon of the second air-guiding element (5).

3. The spoiler assembly (1) as claimed in claim 1,
wherein during the first partial adjustment, the first position-switching device (15, 115) is in the blocking position and blocks the activation of the second adjustment device (7) and, at the end of the first partial adjustment, is adjustable into the open position by the first air-guiding element (4).

4. The spoiler assembly (1) as claimed in claim 1, wherein during the second partial adjustment, both of the first and second air-guiding elements (4, 5) are adjustable.

5. The spoiler assembly (1) as claimed in claim 2, wherein the first and second adjustment devices (6, 7) are pneumatic adjustment devices and each of the first and second position-switching devices (15, 115) has a respective pneumatic valve switchable between an open position for pneumatically supplying pressure to the first or second adjustment device (6, 7) and a blocking position.

6. The spoiler assembly (1) as claimed in claim 5, wherein the first pneumatic adjustment device (6) and the second pneumatic adjustment device (7) are double-acting pneumatic cylinders (6, 7) which are connected in parallel to common pneumatic control outputs (10a, 10b) of a pneumatic spoiler valve (10).

7. The spoiler assembly (1) as claimed in claim 6,
wherein the spoiler valve (10) has two pneumatic control outputs (10a, 10b) to which the first and second adjustment devices (6, 7) are respectively connected,
wherein, during the adjustment and reverse adjustment, respectively, one of the two pneumatic control outputs (10a, 10b) of the spoiler control valve (10) is provided as an active output for outputting compressed air for the adjustment or reverse adjustment, and the other control output (10b, 10a) is provided as a passive output and is connected to a vent (10c).

8. The spoiler assembly (1) as claimed in claim 7, wherein each of the first and second adjustment devices has two pneumatic connections, each of which leading to one of the two control outputs, one of the two pneumatic connections of each of the first and second adjustment devices being connected directly to one of the two pneumatic control outputs, and the other one of the two pneumatic control outputs being connected via a position-switching device (15, 14; 115, 114) to the other one of the two pneumatic control outputs (10a, 10b),
for directly actuating the first adjustment device in the first partial adjustment and for indirectly actuating the second adjustment device in the second partial adjustment and
for directly actuating the second adjustment device in the first partial reverse adjustment and for indirectly actuating of the first adjustment device in the second partial reverse adjustment.

9. The spoiler assembly (1) as claimed in claim 2, wherein at least one of the first and second position-switching devices (14, 15) has a mechanically actuatable control input of a pneumatic valve, which, after the first partial adjustment or after the first partial reverse adjustment, respectively, makes contact with a stop for switching over the position-switching device (14, 15), with a spring-prestressed basic position being the blocking position.

10. The spoiler assembly (1) as claimed in claim 2, wherein each of the first and second position-switching devices (114, 115) has a mechanically activatable electric position switch (24, 25) and an electrically actuatable pneumatic valve (115, 114) which is energized and switched by closing of the electric position switch (24, 25).

11. The spoiler assembly (1) as claimed in claim 2, wherein each of the first and second position-switching devices (15, 14; 115, 114) has a 3/2 way directional control valve (15, 14; 115, 114).

12. The spoiler assembly (1) as claimed in claim 2, wherein each of the first and second adjustment devices is electrically actuated and the first and second position-switching devices have electric switches.

13. The spoiler assembly (1) as claimed in claim 1, wherein it is a rear spoiler assembly, with at least one roof air-guiding element (5) and at least one side air-guiding element (4).

14. The spoiler assembly (1) as claimed in claim 13, wherein the side air-guiding element (4) is the first air-guiding element and the roof air-guiding element (5) is the second air-guiding element,
wherein in the basic position the roof air-guiding element (5) is disposed on or above a rear door (3) and the side air-guiding element (4) is disposed on or against both the rear door (3) and the roof air-guiding element (P1) (5), and,
during the adjustment from the basic position into the driving position in the first partial adjustment, the side air-guiding element (4) is adjustable without adjustment of the roof air-guiding element (5).

15. The spoiler assembly (1) as claimed in claim 13, further comprising, for a truck (1) with more than one rear door, a respective side air-guiding element (4) and a respective roof air-guiding element (5) for each rear door (20), wherein the side air guiding elements are activated synchronously for all rear doors and the roof air guiding elements are activated synchronously for all rear doors via a central spoiler control valve (10).

16. The spoiler assembly (1) as claimed in claim 13, wherein the air-guiding elements (4, 5) and adjustment devices (6, 7), are configured to be exclusively mounted in their entirety on one or more rear doors (20) of the vehicle.

17. A vehicle (2) comprising:
a spoiler assembly (1) as claimed in claim 1 having:
   a first air-guiding element (4) adjustable between a basic position and an activated driving position by a first adjustment device (6),
   a second air-guiding element (5) adjustable between the basic position and the activated driving position by a second adjustment device (7),
   wherein in a first partial adjustment during an adjustment from the basic positon into the driving position, the first air-guiding element (4) is adjustable and the second air-guiding element (5) is not adjustable,
wherein in a second partial adjustment following the first partial adjustment, the second air-guiding element (5) is adjustable, and
wherein the second adjustment device (7) is activated via a first position-switching device (15, 115) which is switchable between an open position for actuating the second adjustment device (7) and a blocking position depending on an adjustment position of the first air-guiding element (4).

18. The vehicle as claimed in claim 17, further comprising side walls and rear doors, wherein, while the first and second adjustment devices are in the basic position, the rear doors (20) are openable and are pivotable forward by virtually 270° for connecting to a respective one of the side walls of the vehicle and for receiving the folded-in spoiler assembly (1) between rear door and the side wall.

19. The spoiler assembly (1) as claimed in claim 2, wherein during the first partial reverse adjustment, the second position-switching device (14, 114) is in the blocking position and blocks the activation of the first adjustment device (6) and, at the end of the first partial reverse adjustment, is adjustable into the open position directly by the second air-guiding element (5).

* * * * *